United States Patent [19]

Ljung

[11] Patent Number: 6,155,115

[45] Date of Patent: Dec. 5, 2000

[54] VIBRATORY ANGULAR RATE SENSOR

[76] Inventor: Per Ljung, 32 Hemlock Ter., Wayne, N.J. 07470

[21] Appl. No.: 08/005,197

[22] Filed: Jan. 14, 1993

Related U.S. Application Data

[63] Continuation-in-part of application No. 07/636,617, Jan. 2, 1991, abandoned.

[51] Int. Cl.[7] ........................................... G01P 9/04
[52] U.S. Cl. ............................................... 73/504.12
[58] Field of Search ............................... 73/505, 504.12

[56] References Cited

U.S. PATENT DOCUMENTS

| | | | |
|---|---|---|---|
| 4,598,585 | 7/1986 | Boxenhorn | 73/505 |
| 4,884,446 | 12/1989 | Ljung | 73/505 |
| 5,203,208 | 4/1993 | Bernstein | 73/505 |

FOREIGN PATENT DOCUMENTS

| | | | |
|---|---|---|---|
| 2113842 | 8/1983 | United Kingdom | 73/505 |
| 2198231 | 6/1988 | United Kingdom | 73/505 |

*Primary Examiner*—John E. Chapman
*Attorney, Agent, or Firm*—William Bohler; Townsend, Townsend, Crowe

[57] ABSTRACT

A single-axis angular rate sensor is comprised of a transducer and associated electronics. The transducer consists of a symmetric planar inertia member supported by symmetrically disposed coplanar elastic beams. The inertia member is angularly oscillated about its center of gravity about a first axis. Rotation of the sensor about a third orthogonal axis results in Coriolis moments, causing angular oscillations about an orthogonal second axis. The angular oscillations about the second axis are restrained by means of voltages applied to electrostatic electrodes. These voltages are proportional to the angular input rate.

3 Claims, 2 Drawing Sheets

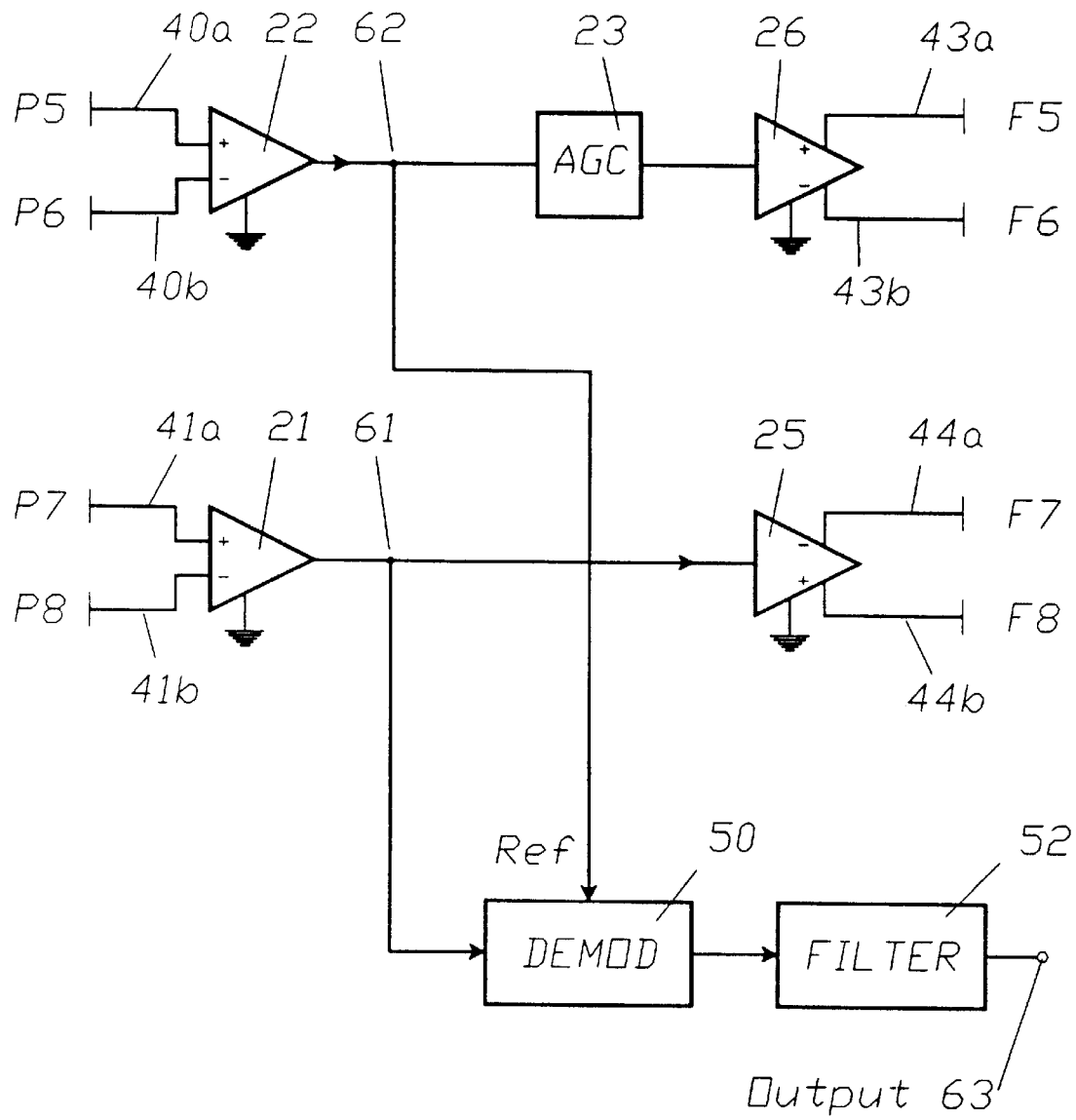

VIBRATORY ANGULAR RATE SENSOR

This application is a continuation-in-part of Ser. No. 07/636,617, filed on Jan. 2, 1991, abandoned.

FIELD OF THE INVENTION

The present invention relates to an angular reference apparatus and particularly to a new type of vibrating angular rate sensor.

BACKGROUND OF THE INVENTION

As strapdown inertial navigation technology continues to progress, there is a need to develop angular rate sensors which have the following characteristics: low cost, small size, lifetime calibration, no thermal control, high reliability, high bandwidth, and rapid reaction.

Prior art vibratory gyroscopes use tuning forks, vibrating beams or vibrating wires. However, their discrete nature has not proven easily adaptable to miniaturization or mass production.

Prior art U.S. Pat. No. 4,598,585 by Boxenhorn describes a planar single-input-axis vibratory gyroscope. Narrow sections of thin film define torsional flexures in a gimbal which supports an inertia member. By angularly oscillating the gimbal, an angular input rate normal to the plane causes the inertia member to vibrate. These oscillations are measured and output as a measure of the angular input rate. An elongated bar is attached to one side of the inertia member in order to make the instrument sensitive to an inertial input rate. The natural frequencies of the drive and sense axes are made to be substantially identical by varying the height to width ratio of the torsional flexures, making tuning dependent upon variations in flexure thickness and width. Because of variations in material thickness and undercutting, it is thus necessary to use discrete balancing weights in order to tune the manufactured sensor.

It is quite difficult to accurately control the material thickness in the micromachining of small structures made from silicon, quartz and other materials. The material thickness tends to vary somewhat from one batch to another. In the type of micromachining used by Boxenhorn, boron is diffused approximately 1 $\mu$m into the silicon base material to define the outline and thickness of the torsional flexures. The heavily boron impregnated layer etches much slower than the base material during EDP etching and is therefore used as an etch stop. The boron diffusion process is difficult to control in order to obtain a uniform flexure thickness from one batch to another due to the many process parameters involved and the high temperature required. Another problem with the boron diffusion is that the width of the narrow torsional flexures is difficult to control due to sideways mobility of boron during the high temperature diffusion process. This tends to make the width of the flexures wider than the openings in the mask used to define the diffusion pattern.

Undercutting or underetching is a phenomena that occurs during etching in which the etching does not exactly follow the masking pattern. Underetching causes the etchant to delineate torsional flexures that have a different width than intended. The amount of underetching tends to vary somewhat from one batch to another.

The above problems cause the resulting flexures to vary in thickness, width and length from one batch to another. The different moments of inertia between the x- and y-axes in Boxenhorn's device due the presence of the gimbal and the elongated bar located on the inner element make it necessary to use torsional flexures of different widths for support of the gimbal and the inner element in order to obtain equal natural resonant frequencies. The ratio of the torsional stiffness of the flexures used in the x- and y-axis must have a predetermined ratio which depends on the ratio of moment of inertia about the same axes.

The required different flexure dimensions in Boxenhorn's design becomes a problem because of the processing problems cited. Variations in underetching and in sheet material thickness cause the nominally equal natural resonant frequencies about the x- and y-axes to differ from the desired value and from each other. Such a condition is unacceptable and requires costly and difficult trimming of the device in order to obtain equal natural resonance frequencies of the gimbal and the inertia member.

It is an object of this invention to reveal a new vibratory angular rate gyro. A further object is to provide a vibratory angular rate gyro where tuning using discrete balancing weights is not required since the drive and sense axes natural resonant frequencies are identical due to symmetry.

SUMMARY OF THE INVENTION

According to the present invention, there is provided a class of angular rate sensors with one input axis. The angular rate sensor comprises a planar inertia member connected to a fixed support by a coplanar suspension means. The suspension means is configured to allow limited angular excursions of the inertia member about three orthogonal reference axes. The first and second reference axes define the plane of the inertia member and suspension. The present invention avoids the manufacturing problems of a gimbal by using a regular symmetric construction of the inertia element and flexures. Regular symmetry denotes that the sensor is symmetric about the x-axis, the y-axis and also about an axis that bisects the x- and y-axes. This regular symmetry implies that the structures in each quadrant of the xy-plane, i.e. inertia member and elastic beams, are identical with respect to width, thickness and length. Equal resonant frequencies are therefore automatically obtained for angular motion about the x- and y-axes. Small batch to batch variations in material sheet thickness, and therefore in the flexible beam thickness do not cause a difference between the x- and y-axes natural frequencies but merely changes the magnitude of both frequencies by the same amount. Similarly, changes in the widths or lengths of the elastic beams due to underetching do not cause a difference between the x- and y-axes natural frequencies. Batch to batch variations in underetching and material thickness variations result in equal changes in both the x- and y-axes frequencies, which is acceptable and which occurrence does not require trimming.

The inertia member is angularly oscillated at its natural frequency about the first axis by forcers. An electronic feedback signal from a pickoff, with the help of automatic gain control (AGC), ensures a constant oscillation amplitude. The oscillating inertia member creates an oscillatory angular momentum vector.

An angular input rate about the third axis, orthogonal to the first axis, causes angular oscillations about the first axis to shift to the second orthogonal axis due to the Coriolis effect. Pickoffs measure the angular oscillations of the inertia member about the second axis and drive forcers which create a torque that restrains the angular oscillations about the second axis. The torque amplitude is equal to the Coriolis moment and is thus proportional to the angular input rate about the third axis.

The inertia member and elastic beams can be integrally formed in the same plane, which permits angular rate sensors to be produced from sheets using mass production technology. In the preferred embodiment, the inertia member and four elastic beams are integrally formed by micromachining from a sheet of single crystal quartz or silicon or from a thin film of polycrystalline silicon.

Electrostatic forcer and pickoff electrodes are located on a non conductive support. The inertia member is mounted on the support with a fixed gap between the lower surface of the inertia member and the electrodes. The instrument has a symmetric configuration ensuring that the natural resonant frequencies about the drive and sense axes are substantially identical regardless of variations in material thickness or variations in undercutting. This reduces or eliminates the need for balancing.

Full details of the present invention are set forth in the following description of the preferred embodiments, as illustrated in the accompanying drawings, wherein:

BRIEF DESCRIPTION OF FIGURES

FIG. 3 is a schematic view of the electronics for the embodiment shown in FIG. 1 and 2.

DETAILED DESCRIPTION OF PREFERRED EMBODIMENT

Figure 1:
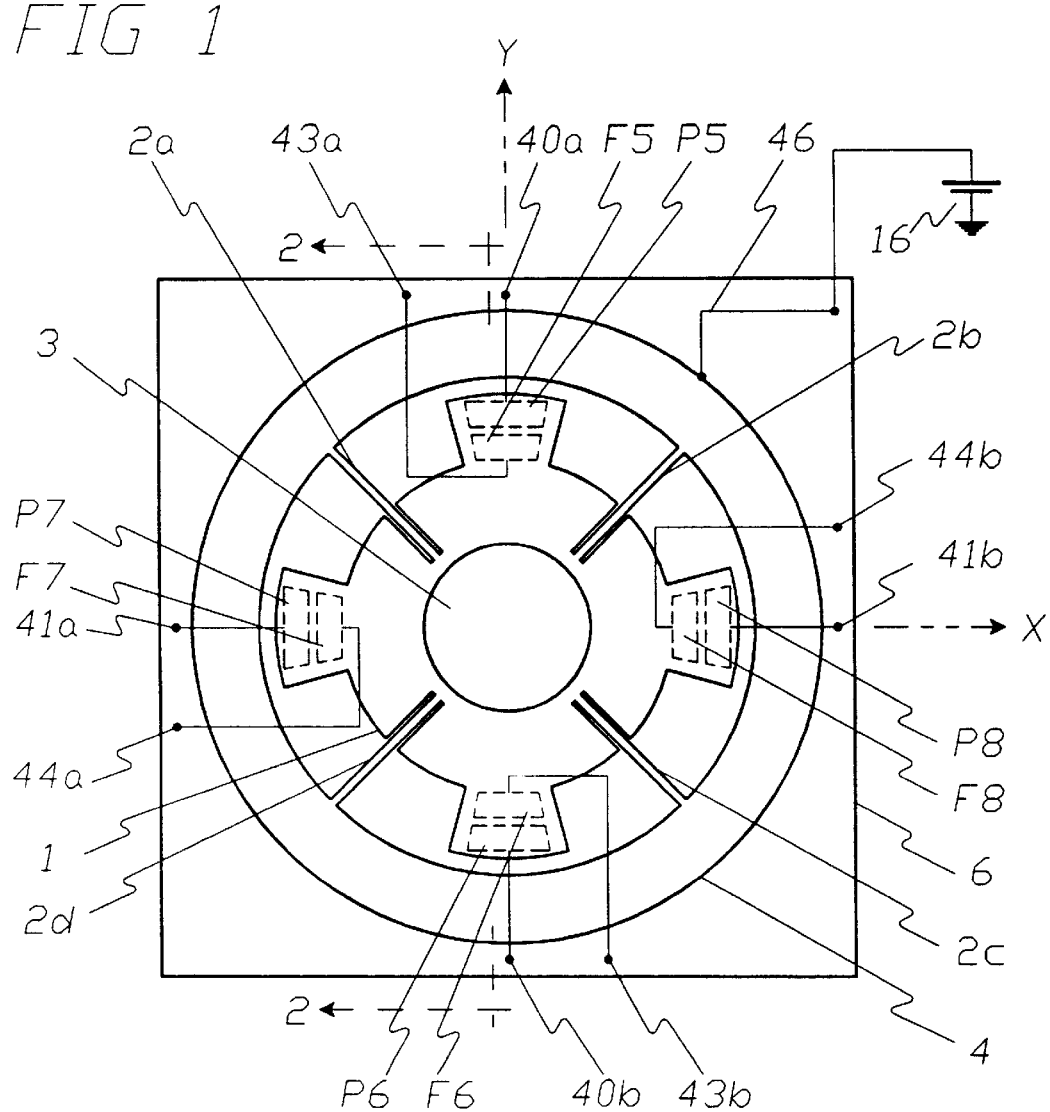
FIG. 1 is a plan view of the preferred embodiment showing the inertia member, four elastic beams, electrodes and support.

With reference to FIG. 1, the first, second and third reference axes correspond to the X-, Y- and Z-axes which pass through the center of gravity of the planar inertia member 1. Inertia member 1 is symmetric about the first and second reference axes. Weights 3 and 5 are attached to the top and bottom of the inertia member 1 in order to achieve an increased angular rate sensitivity. The suspension means that supports the inertia member 1 comprises four coplanar elastic beams 2a, 2b, 2c and 2d of a polygon shaped cross-section which at mounting area 4 are fixed to non conductive support 6. The elastic beams allow torsional and bending movement about the X, Y and Z axes for inertia member 1. The elastic beams are symmetrically disposed about the first and second reference axes and the CG of the inertia member such that a linear acceleration causes the inertia member to deflect linearly, without a rotational component. The elastic beams may be aligned intermediate between the X and Y axes, as shown in FIG. 1, or alternatively be aligned along the X and Y axes. Support 6 is mounted with a fixed gap in relation to the lower surface of inertia member 1. The present invention utilizes a planar inertia member of regular symmetrical shape with two symmetrically disposed weights 3 and 5. The weights are preferably made from Pyrex borosilicate glass and are attached by means of anodic bonding to the inertia member. The center of gravity coincides with the origin of the x-, y- and z-axes. Linear vibrations in the x- y-plane do therefore not cause any mechanical moments that degrade the accuracy of the instrument since the extension of the beams intersect the center of gravity of the inertia member. The inertia member is angularly oscillated about the first reference axis by forcers causing the vibratory angular rate sensor to be sensitive to angular input rates about the third reference axis.

The inventor has found that for high rate sensitivity, the natural frequencies for the angular oscillations about the first and second reference axes ($\omega_1$, $\omega_2$) should be substantially identical. This is automatically achieved if the inertia member, weights and elastic beams are disposed with regular symmetry. Regular symmetry implies that the structures in each quadrant in the xy-plane may be created by rotating and copying the structures in the first quadrant about the origin. Both the inertia element and the beams have regular symmetry and the structures in each quadrant of the xy-plane are identical with respect to width, thickness and length. Equal resonant frequencies are therefore automatically obtained for angular motion about the x- and y-axes, provided that the weights are identical and symmetrically attached to the inertia member. Small batch to batch variations in material sheet thickness, and therefore in the flexible beam thickness do not cause a difference between the x- and y-axes natural frequencies because of this symmetry. Also changes in the width or length of the elastic beams due to underetching do not cause a difference between the x- and y-axes natural frequencies. Batch to batch variations in material sheet thickness and variations in underetching do, however, cause an equal change in both the x- and y-axes frequencies which is acceptable and which does not require trimming. In the preferred embodiment, the natural drive and sense frequencies are made approximately 8000 Hz.

With reference to FIG. 1, two forcer electrodes designated F5 and F6 and two pickoff electrodes designated P5 and P6 are symmetrically disposed about the first reference axis on support 6. Two forcer electrodes designated F7 and F8 and two pickoff electrodes designated P7 and P8 are symmetrically disposed about the second reference axis on support 6. Inertia member 1, beams 2 and mounting area 4 are rendered electrically conductive and connected to lead 46. Inertia member 1 is configured as a common electrode to the electrodes on support 6. Bias voltage 16 is connected to inertia member 1 with electrical lead 46.

Figure 2:
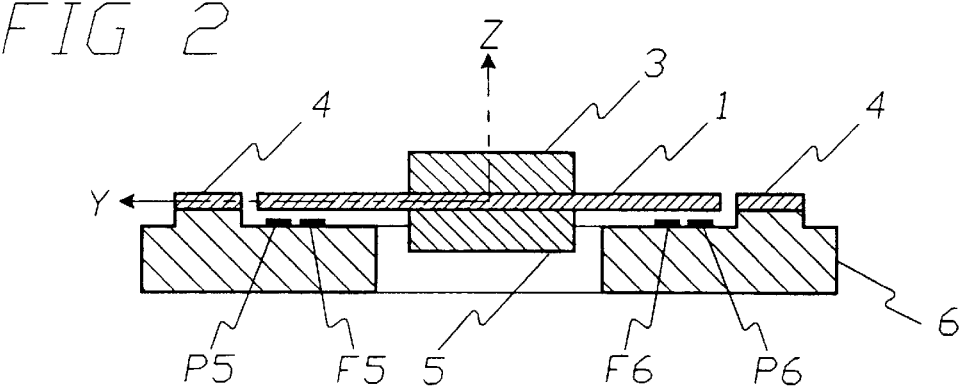
FIG. 2 is a cross-sectional view of the embodiment in FIG. 1, taken along section 2—2.

FIG. 2 shows a cross-sectional view of the structure shown in FIG. 1, taken along section 2—2. Weights 3 and 5 are symmetrically attached to inertia member 1 about its center of gravity.

With reference to FIG. 1 and 3, when inertia member 1 angularly oscillates about the first reference axis over pickoff electrodes P5 and P6, the gap in the electrode area covered by inertia member 1 will change, varying the capacitance. With bias voltage 16, pickoff electrodes P5 and P6 sense the angular oscillations of inertia member 1 about the first reference axis. Electrical leads 40a and 40b connect pickoff electrodes P5 and P6 to difference amplifier 22. The output of 22 is AC signal 62, which represents the angular position of inertia member 1 about the first reference axis. Signal 62 passes through automatic gain control (AGC) 23 into push-pull amplifier 26. A push-pull amplifier has a gain that produces two outputs which are equal in magnitude and opposite in sign. Electrical lead 43a connects the positive output to forcer electrode F5. Electrical lead 43b connects the negative output to forcer electrode F6. With bias voltage 16, forcer electrodes F5 and F6 create an electrostatic torque, angularly oscillating inertia member 1 about the first reference axis at its natural frequency. The AGC 23 ensures that angular oscillations have a constant amplitude.

An angular input rate about the third reference axis causes angular oscillations about the second reference axis due to the Coriolis effect. The distance between inertia member 1 and pickoff electrodes P7 and P8 will change, varying the capacitance. With bias voltage 16, pickoff electrodes P7 and P8 thus sense the angular oscillations of inertia member 1 about the second reference axis. Electrical leads 41a and 41b connect pickoff electrodes P7 and P8 to difference amplifier 21. The output of 21 is an AC signal 61, which represents the angular position of inertia member 1 about the second reference axis. Signal 61 is amplified in push-pull amplifier 25. Electrical lead 44a connects the negative output to forcer electrode F7 and electrical lead 44b connects the positive output to forcer electrode F8. With bias voltage 16, forcer electrodes F7 and F8 create an electrostatic torque, restraining the angular oscillations of inertia member 1 about the second reference axis. The amount of torque required to restrain the angular oscillations is equal to the Coriolis moment. The sinusoidal signal 61 is synchronously demodulated in 50 using signal 62 as a reference, and then low pass filtered in 52 to create a DC signal 63 which is proportional to the angular input rate about the third reference axis.

As shown, the electrodes are fixed to the surface of support 6, which is mounted with a fixed gap relative the lower surface of inertia member 1. In alternate embodiments, the electrodes may be fixed relative the upper surface of inertia member 1 or both the upper and lower surfaces of inertia member 1. It is understood that the forcers and pickoffs are not limited to electrostatic elements, but can be replaced by suitably configured electromagnetic or piezoelectric elements.

Because of the symmetry of the inertia member and the suspension, the natural resonant frequency about the first and the second reference axes will be substantially identical and independent of the material thickness or undercutting. This eliminates or reduces the need for balancing and tuning due to variations in material thickness or variations in manufacturing.

Beams made from materials such as single crystal quartz or silicon have high strength and low intrinsic damping. The low damping reduces the motor drive requirements which in turn reduces the output bias. Since the angular oscillation movement of inertia member 1 is electrically restrained about the second axis, a viscous gas fill for damping purposes is unnecessary. Instead the sensor is operated in an evacuated environment, further reducing the motor drive requirement.

The inventor has found that, providing the angular oscillations of the inertia member are limited to the first reference axis, most errors due to, for instance, small differences in natural frequencies, damping and spring rate proportionality about the first and second reference axes can be tolerated by themselves or in combinations without causing undue angular rate bias errors.

While the preferred embodiment of the present invention is disclosed herein for purposes of explanation, numerous changes, modifications, variations, substitutions and equivalents, in whole or in part, should now be apparent to those skilled in the art to which this invention pertains. Accordingly, it is intended that the invention be limited only by the spirit and scope of the appended claims.

What is claimed is:

1. An inertial sensor comprising:

an inertia member extending substantially in a plane, a first and second reference axes extending in said plane and a third reference axis extending perpendicular to the plane, said three reference axes being mutually perpendicular and intersecting the center of gravity of said inertia member, suspension means connecting the inertia member to a support for supporting the inertia member in said plane, wherein said suspension means comprises four elastic beams extending substantially in said plane between said support and said inertia member, the longitudinal axes of said beams intersecting said center of gravity, said elastic beams allowing limited angular motion of said inertia member about said reference axes;

electrostatic driving means to drive said inertia member in an angular oscillatory motion about said first reference axis; and electrostatic sensing means for sensing angular oscillatory motion of the inertia member about the second reference axis, said angular oscillatory motion caused by Coriolis forces due to angular rotation of the inertial sensor about said third reference axis.

2. An inertial sensor according to claim 1, further comprising:

means to substantially restrain oscillatory angular motion of said inertia member about said second reference axis, wherein said means to restrain the motion generates a signal representative of the torque required to restrain the motion.

3. An inertial sensor according to claim 2, wherein said driving, sensing and restraining means comprise coplanar electrostatic elements.

\* \* \* \* \*